US008082145B2

(12) United States Patent
Mowatt et al.

(10) Patent No.: US 8,082,145 B2
(45) Date of Patent: Dec. 20, 2011

(54) CHARACTER MANIPULATION

(75) Inventors: David Mowatt, Seattle, WA (US); Robert Chambers, Sammamish, WA (US); Felix GTI Andrew, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/825,006

(22) Filed: Jun. 28, 2010

(65) Prior Publication Data

US 2010/0265257 A1   Oct. 21, 2010

Related U.S. Application Data

(63) Continuation of application No. 10/997,255, filed on Nov. 24, 2004, now Pat. No. 7,778,821.

(51) Int. Cl.
*G06F 17/27* (2006.01)

(52) U.S. Cl. ............. 704/9; 704/10; 704/231; 704/251; 715/255; 715/256; 715/257; 715/259; 341/22; 345/163; 345/178; 455/556.1

(58) Field of Classification Search ............... 704/9, 10, 704/231, 251; 715/255, 256, 257, 259; 345/173, 345/168; 455/556.1; 341/22
See application file for complete search history.

(56) References Cited

U.S. PATENT DOCUMENTS

| | | | |
|---|---|---|---|
| 5,007,008 A * | 4/1991 | Beers ........................ 708/145 |
| 5,027,406 A | 6/1991 | Roberts et al. | |
| 5,046,096 A * | 9/1991 | Kuhlman et al. ............. 380/57 |
| 5,265,065 A | 11/1993 | Turtle | |
| 5,632,002 A | 5/1997 | Hashimoto et al. | |
| 5,682,439 A | 10/1997 | Beernink et al. | |
| 5,710,831 A | 1/1998 | Beernink et al. | |
| 5,754,847 A | 5/1998 | Kaplan et al. | |
| 5,799,276 A * | 8/1998 | Komissarchik et al. ...... 704/251 |
| 5,852,801 A | 12/1998 | Hon et al. | |
| 5,987,170 A | 11/1999 | Yamamoto et al. | |
| 6,078,914 A | 6/2000 | Redfern | |
| 6,085,159 A | 7/2000 | Ortega et al. | |
| 6,088,692 A | 7/2000 | Driscoll | |
| 6,125,347 A | 9/2000 | Cote et al. | |
| 6,173,253 B1 * | 1/2001 | Abe et al. ..................... 704/10 |
| 6,192,343 B1 | 2/2001 | Morgan et al. | |
| 6,260,015 B1 * | 7/2001 | Wang et al. ................. 704/257 |
| 6,307,548 B1 | 10/2001 | Flinchem et al. | |

(Continued)

FOREIGN PATENT DOCUMENTS

EP   0911808   4/1999

(Continued)

OTHER PUBLICATIONS

"Summons to Attend Oral Proceedings", Application Serial No. 05110082.4, (Apr. 6, 2009),9 pages.

(Continued)

*Primary Examiner* — David R Hudspeth
*Assistant Examiner* — Lamont Spooner

(57) ABSTRACT

Embodiments for manipulating characters displayed on a display screen are provided, wherein one example method includes identifying a selected word, wherein the selected word includes at least one character to be modified. The method further includes correlating each of the at least one character with a unique numerical value and receiving a selection command and a modification command, wherein the selection command is the unique numerical value corresponding to a selected character. Furthermore, the method includes modifying the selected character responsive to the modification command to generate a modified word.

20 Claims, 14 Drawing Sheets

U.S. PATENT DOCUMENTS

| | | | |
|---|---|---|---|
| 6,363,342 B2 | 3/2002 | Shaw et al. | |
| 6,501,833 B2 | 12/2002 | Phillips et al. | |
| 6,556,841 B2 | 4/2003 | Yu | |
| 6,591,236 B2 | 7/2003 | Lewis et al. | |
| 6,615,177 B1 | 9/2003 | Rapp et al. | |
| 6,618,726 B1 | 9/2003 | Colbath et al. | |
| 6,636,162 B1 | 10/2003 | Kushler et al. | |
| 6,646,573 B1 | 11/2003 | Kushler et al. | |
| 6,728,700 B2 | 4/2004 | Richards et al. | |
| 6,760,012 B1* | 7/2004 | Laurila | 345/169 |
| 6,847,311 B2* | 1/2005 | Li | 341/28 |
| 6,873,993 B2 | 3/2005 | Charlesworth et al. | |
| 7,085,723 B2 | 8/2006 | Ross et al. | |
| 7,119,794 B2 | 10/2006 | Kong | |
| 7,130,790 B1 | 10/2006 | Flanagan et al. | |
| 7,174,294 B2 | 2/2007 | Schmid et al. | |
| 7,206,747 B1 | 4/2007 | Morgan et al. | |
| 7,243,305 B2 | 7/2007 | Schabes et al. | |
| 7,353,166 B2 | 4/2008 | Li et al. | |
| 7,505,910 B2 | 3/2009 | Kujirai | |
| 7,778,821 B2 | 8/2010 | Mowatt | |
| 2001/0044726 A1 | 11/2001 | Li et al. | |
| 2002/0048350 A1 | 4/2002 | Phillips et al. | |
| 2002/0052870 A1 | 5/2002 | Charlesworth et al. | |
| 2002/0133354 A1 | 9/2002 | Ross et al. | |
| 2002/0161584 A1 | 10/2002 | Lewis et al. | |
| 2003/0014260 A1 | 1/2003 | Coffman et al. | |
| 2003/0234818 A1 | 12/2003 | Schmid et al. | |
| 2004/0073540 A1 | 4/2004 | Wang et al. | |
| 2004/0165924 A1* | 8/2004 | Griffin | 400/486 |
| 2004/0168131 A1* | 8/2004 | Blumberg | 715/534 |
| 2004/0217944 A1* | 11/2004 | Kong | 345/173 |
| 2004/0243415 A1 | 12/2004 | Commarford et al. | |
| 2004/0243746 A1* | 12/2004 | Wong | 710/72 |
| 2004/0260562 A1 | 12/2004 | Kujirai | |
| 2005/0027539 A1 | 2/2005 | Weber et al. | |
| 2005/0049880 A1* | 3/2005 | Roth et al. | 704/277 |
| 2005/0075857 A1 | 4/2005 | Elcock et al. | |
| 2005/0108026 A1 | 5/2005 | Brierre et al. | |
| 2006/0106614 A1 | 5/2006 | Mowatt et al. | |
| 2006/0136195 A1 | 6/2006 | Agapi et al. | |
| 2006/0190256 A1 | 8/2006 | Stephanick et al. | |
| 2007/0189724 A1 | 8/2007 | Wan et al. | |

FOREIGN PATENT DOCUMENTS

| | | |
|---|---|---|
| EP | 911808 | 4/1999 |
| EP | 1045374 | 10/2000 |
| JP | 2004093698 | 3/2004 |
| JP | 2004093698 A * | 3/2004 |
| WO | WO-9525326 | 9/1995 |

OTHER PUBLICATIONS

"Non Final Office Action", U.S. Appl. No. 10/997,255, (May 12, 2009),16 pages.

"Advisory Action", U.S. Appl. No. 10/990,345, (Jan. 13, 2009),3 pages.

"Non-Final Office Action", U.S. Appl. No. 10/990,345, (Jul. 31, 2009),16 pages.

Iftikhar, Ahmad et al., "Query by Image Content Using Nokia 9210 Communicator", *Proceedings of the Workshop on Image Analysis for Multimedia Interactive Services, WIAMIS '01*, (May 2001),5 pages.

Wasinger, et al., "Robust Speech Interaction in a mobile environment through the use of multiple and different media input types", *Proc. of EuroSpeech.*, (2003),1049-1052.

Gu, Huixiang et al., "Spoken Query for Web Search and Navigation", Retrieved from: <http://www10.org/cdrom/posters/p1010/index.htm> on Sep. 8, 2009, (2001),5 pages.

Chang, Eric et al., "Efficient Web Search on Mobile Devices with Multi-Modal Input and Intelligent Text Summarization", *Poster Proceedings, The 11th International World Wide Web Conference 2002*, (May 2002),4 pages.

Manaris, Bill "Universal Access to Mobile Computing Devices through Speech Input", *Proceedings of 12th International Florida AI Research Symposium (FLAIRS-99)*, (May 1999),7 pages.

Seide, Frank et al., "Vocabulary-Independent Search in Spontaneous Speech", *2005 IEEE International Conference on Speech Acoustics and Signal Processing*, Philadelphia, PA,(Mar. 2005),4 pages.

Kvale, Knut et al., "Speech Centric Multimodal Interfaces for Mobile Communication Systems", *Telektronikk*, (Feb. 2003),pp. 104-117.

Myers, Brad et al., "Flexi-modal and Multi-Machine User Interfaces", *IEEE Fourth International Conference on Multimodal Interfaces*, Pittsburgh, PA,(Oct. 2002),6 pages.

Chang, Eric et al., "A System for Spoken Query Information Retrieval on Mobile Devices", *IEEE Transactions on Speech and Audio Processing*, vol. 10, No. 8, (Nov. 2002),pp. 531-541.

"Efficient Multimodal Method to Provide Input to a Computing Device", U.S. Appl. No. 10/889,822, filed Jul. 13, 2004, (Feb. 16, 2006),22 pages.

"Search Report", Application Serial No. 05109794.7, (Mar. 21, 2006),5 pages.

Potamitis, I. et al., "An Integrated System for Smart-Home Control of Appliances Based on Remote Speech Interaction", *In Proceedings of the 8th European Conference on Speech Communication and Technology (Eurospeech 2003)*, Geneva, Switzerland, Sep. 1-4, 2003,(2003),4 pages.

"European Search Report", Application No. EP05106352.7, (Nov. 8, 2005),5 pages.

"Non Final Office Action", U.S. Appl. No. 10/990,345, (Mar. 17, 2008),20 pages.

"Final Office Action", U.S. Appl. No. 10/990,345, (Oct. 28, 2008),15 pages.

Reithinger, Norbert et al., "SmartKom—Adaptive and Flexible Multimodal Access to Multiple Applications", *In Proceedings of the 5th International Conference on Multimodal Interfaces (Vancouver, British Columbia, Canada, N.*, DFKI GmbH—German Research Center for Artificial Intelligence,(Nov. 2003),8 pages.

"Decision to Refuse a European Patent Application", EP Application No. 05110082.4, (Nov. 11, 2009),15 pages.

"Final Office Action", U.S. Appl. No. 10/997,255, (Dec. 17, 2009),18 pages.

"Notice of Allowance", U.S. Appl. No. 10/997,255, (May 21, 2010),9 pages.

"Foreign Office Action", Chinese Application No. 200510116498.9, (Nov. 19, 2010),13 pages.

"Foreign Office Action", Chinese Application No. 200510116498.9, (Jun. 24, 2010),12 pages.

"Foreign Office Action", Chinese Application No. 200510116498.9, (May 12, 2011),11 pages.

* cited by examiner

CHARACTER MANIPULATION

CROSS-REFERENCE

This application is a continuation of and claims priority to U.S. patent application Ser. No. 10/997,255, entitled "Controlled Manipulation of Characters," filed on Nov. 24, 2004, the disclosure of which is incorporated herein by reference in its entirety.

BACKGROUND

Speech is perhaps the oldest form of human communication and many scientists now believe that the ability to communicate through vocalization is inherently provided in the biology of the human brain. Thus, it has been a long-sought goal to allow users to communicate with computers using a Natural User Interface (NUI), such as speech. In fact, recently great strides have been made in obtaining this goal. For example, some computers now include speech recognition applications that allow a user to vocally input both commands for operating the computer and dictation to be converted into text. These applications typically operate by periodically recording sound samples taken through a microphone, analyzing the samples to recognize the phonemes being spoken by the user and identifying the words made up by the spoken phonemes.

While speech recognition is becoming more commonplace, there are still some disadvantages to using conventional speech recognition applications that tend to frustrate the experienced user and alienate the novice user. One such disadvantage involves the interaction between the speaker and the computer. For example, with human interaction, people tend to control their speech based upon the reaction that they perceive in a listener. As such, during a conversation, a listener may provide feedback by nodding or making vocal responses, such as "yes" or "uh-huh", to indicate that he or she understands what is being said to them. Additionally, if the listener does not understand what is being said to them, the listener may take on a quizzical expression, lean forward, or give other vocal or non-vocal cues. In response to this feedback, the speaker will typically change the way he or she is speaking and in some cases, the speaker may speak more slowly, more loudly, pause more frequently, or even repeat a statement, usually without the listener even realizing that the speaker is changing the way they are interacting with the listener. Thus, feedback during a conversation is a very important element that informs the speaker as to whether or not they are being understood. Unfortunately however, conventional voice recognition applications are not yet able to provide this type of "Natural User Interface (NUI)" feedback response to speech inputs/commands facilitated by a man-machine interface.

Currently, voice recognition applications have achieved an accuracy rate of 90% to 98%. This means that when a user dictates into a document using a typical voice recognition application their speech will be accurately recognized by the voice recognition application approximately 90% to 98% of the time. Thus, out of every one hundred (100) letters recorded by the voice recognition application, approximately two (2) to ten (10) letters will have to be corrected. Two common ways to address this problem and correct misrecognized letter or words involves the repeating, or re-speaking, of a letter or word or the requesting of a speech alternative. However, these two approaches do not work every time the user performs a correction and is thus particularly disadvantageous to a certain class of user that must use speech when performing corrections, e.g. those users who are physically unable to use a keyboard.

Another approach to addressing this problem and correcting a misrecognized letter or word that is displayed on a display screen, involves deleting the entire word and respelling the word from the beginning For example, to change the word "intent" to "indent", the user would have to say "delete intent" and then re-spell the desired word by saying "i", "n", "d", "e", "n", "t". Still another approach to addressing this problem and correcting the misrecognized word that is displayed on a display screen involves controlling the keyboard by voice to change the letters which are wrong. In this case, the user must delete all of the letters in a word up to the letter which needs to be changed. Then they respell the rest. For example, to change the word "intent" to "indent", the user would say "backspace backspace backspace backspace", and then re-spell the desired word by saying "d", "e", "n", "t".

Unfortunately however, these approaches have several disadvantages associated with them. First, a large number of commands are required to change one letter. Second, these approaches rely on the respelling of a large number of letters and, as the current state of the art Speech Recognition accuracy is only nine (9) letters in ten (10) are correct, this means that after having to correct just two or three words by resorting to re-spelling, the user is statistically likely to get an error. This means that the user has to pause after each letter to ensure that it is correct (which adds time) or the user has to endure the fact that they will likely have to say "backspace backspace . . . " then re-spell the word again on multiple occasions. Third, because speech recognition mistakes are often only a couple of letters different from the word that the user intended, very often the word whose spelling the user is manipulating is very close to the word the user intended. Not only do these disadvantages tend to create frustration in frequent users, but they also tend to be discouraging to novice users as well, possibly resulting in the user refusing to continue employing the voice recognition application.

SUMMARY

A method for manipulating characters displayed on a display screen is provided wherein the method includes identifying a selected word, wherein the selected word includes at least one character to be modified. The method further includes correlating each of the at least one character with a unique numerical value and receiving a selection command and a modification command, wherein the selection command is the unique numerical value corresponding to a selected character. Furthermore, the method includes modifying the selected character responsive to the modification command to generate a modified word.

A system for implementing a method for manipulating characters displayed on a display screen is provided wherein the system includes a storage device, wherein the storage device includes an audio module configured to receive an entered command. The system also includes an input device for receiving the entered command and a display device, wherein the display device includes the display screen for displaying the entered command. Furthermore, the system includes a processing device, wherein the processing device is communicated with the storage device, the input device and the display device, such that the processing device receives instructions to cause a spelling UI to be displayed on the display screen and to manipulate displayed data responsive to the entered command.

A machine-readable computer program code is provided, wherein the program code includes instructions for causing a processing device to implement a method for manipulating characters displayed on a display screen. The method includes identifying a selected word, wherein the selected word includes at least one character to be modified and correlating each of the at least one character with a unique numerical value. The method further includes receiving a selection command and a modification command, wherein the selection commands is the unique numerical value corresponding to a selected character and modifying the selected character responsive to the modification command to generate a modified word.

A medium encoded with a machine-readable computer program code is provided, wherein the program code includes instructions for causing a processing device to implement a method for manipulating characters displayed on a display screen. The method includes identifying a selected word, wherein the selected word includes at least one character to be modified and correlating each of the at least one character with a unique numerical value. The method further includes receiving a selection command and a modification command, wherein the selection command is the unique numerical value corresponding to a selected character and modifying the selected character responsive to the modification command to generate a modified word.

BRIEF DESCRIPTION OF THE FIGURES

The foregoing and other features and advantages of certain embodiments will be more fully understood from the following detailed description of illustrative embodiments, taken in conjunction with the accompanying drawings in which like elements are numbered alike in the several Figures.

DETAILED DESCRIPTION

Although embodiments are described herein in the context of a standalone and/or integrated application module used with a general purpose computer implemented system which uses a speech recognition application to receive and recognize voice commands entered by a user, it should be appreciated that embodiments may be used in any context suitable to the desired end purpose. For example, some embodiments may include an integrated software routine or feature within a target software application, such as Microsoft® Word having a speech recognition module that practices the method of positioning a software User Interface (UI) window on a display screen and/or some embodiments may include a routine or feature within the operating system of the general purpose computer. As an object-oriented application, the application module may expose a standard interface that client programs may access to communicate with the application module. The application module may also permit a number of different client programs, such as a word processing program, a desktop publishing program, an application program, and so forth, to use the application module locally and/or over network, such as a WAN, a LAN and/or an internet based vehicle. For example, the application module may be accessed and used with any application and/or control having a text field, such as an email application or Microsoft® Word, locally or via an internet access point. However, before describing aspects of various embodiments, one embodiment of a suitable computing environment is described below.

Figure 1:
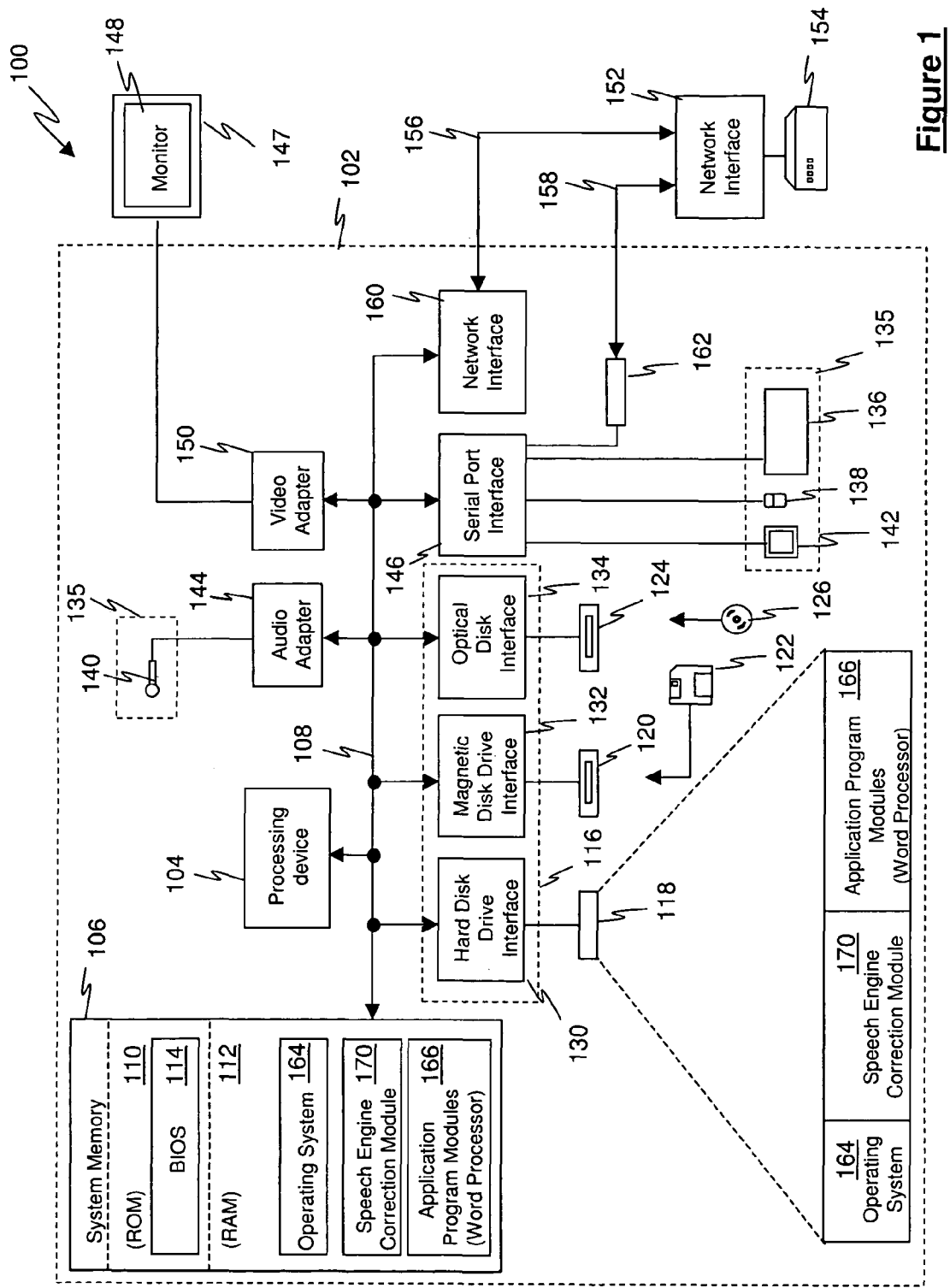
FIG. 1 is a schematic block diagram illustrating a system for implementing a method for manipulating characters displayed on a display screen using a speech recognition software application having a spelling User Interface (UI), in accordance with one or more embodiments.

Referring to FIG. 1, a block diagram illustrating a system 100 for implementing a method for manipulating characters displayed on a display screen by a target software application using a speech recognition software application having a spelling User Interface (UI) is shown and includes a general computer system 102, including a processing device 104, a system memory 106, and a system bus 108, wherein the system bus 108 couples the system memory 106 to the processing device 104. The system memory 106 may include read only memory (ROM) 110 and random access memory (RAM) 112. A basic input/output system 114 (BIOS), containing basic routines that help to transfer information between elements within the general computer system 102, such as during start-up, is stored in ROM 110. The general computer system 102 further includes a storage device 116, such as a hard disk drive 118, a magnetic disk drive 120, e.g., to read from or write to a removable magnetic disk 122, and an optical disk drive 124, e.g., for reading a CD-ROM disk 126 or to read from or write to other optical media. The storage device 116 may be connected to the system bus 108 by a storage device interface, such as a hard disk drive interface 130, a magnetic disk drive interface 132 and an optical drive interface 134. The drives and their associated computer-readable media provide nonvolatile storage for the general computer system 102. Although the description of computer-readable media above refers to a hard disk, a removable magnetic disk and a CD-ROM disk, it should be appreciated that other types of media that are readable by a computer system and that are suitable to the desired end purpose may be used, such as magnetic cassettes, flash memory cards, digital video disks, Bernoulli cartridges, and the like.

A user may enter commands and information into the general computer system 102 through a conventional input device 135, including a keyboard 136, a pointing device, such as a mouse 138 and a microphone 140, wherein the microphone 140 may be used to enter audio input, such as speech, into the general computer system 102. Additionally, a user may enter graphical information, such as drawings or hand writing, into the general computer system 102 by drawing the graphical information on a writing tablet 142 using a stylus. The general computer system 102 may also include additional input devices suitable to the desired end purpose, such as a joystick, game pad, satellite dish, scanner, or the like. The microphone 140 may be connected to the processing device 104 through an audio adapter 144 that is coupled to the system bus 108. Moreover, the other input devices are often connected to the processing device 104 through a serial port interface 146 that is coupled to the system bus 108, but may also be connected by other interfaces, such as a game port or a universal serial bus (USB).

A display device 147, such as a monitor or other type of display device 147, having a display screen 148, is also connected to the system bus 108 via an interface, such as a video adapter 150. In addition to the display screen 148, the general computer system 102 may also typically include other peripheral output devices, such as speakers and/or printers. The general computer system 102 may operate in a networked environment using logical connections to one or more remote computer systems 152. The remote computer system 152 may be a server, a router, a peer device or other common network node, and may include any or all of the elements described relative to the general computer system 102, although only a remote memory storage device 154 has been illustrated in FIG. 1. The logical connections as shown in FIG. 1 include a local area network (LAN) 156 and a wide area network (WAN) 158. Such networking environments are commonplace in offices, enterprise-wide computer networks, intranets and the Internet.

When used in a LAN networking environment, the general computer system 102 is connected to the LAN 156 through a network interface 160. When used in a WAN networking environment, the general computer system 102 typically includes a modem 162 or other means for establishing communications over a WAN 158, such as the Internet. The modem 162, which may be internal or external, may be connected to the system bus 108 via the serial port interface 146. In a networked environment, program modules depicted relative to the general computer system 102, or portions thereof, may be stored in the remote memory storage device 154. It should be appreciated that the network connections shown are exemplary and other means of establishing a communications link between the computer systems may be used. It should also be appreciated that the application module could equivalently be implemented on host or server computer systems other than general computer systems, and could equivalently be transmitted to the host computer system by means other than a CD-ROM, for example, by way of the network connection interface 160.

Figure 2:
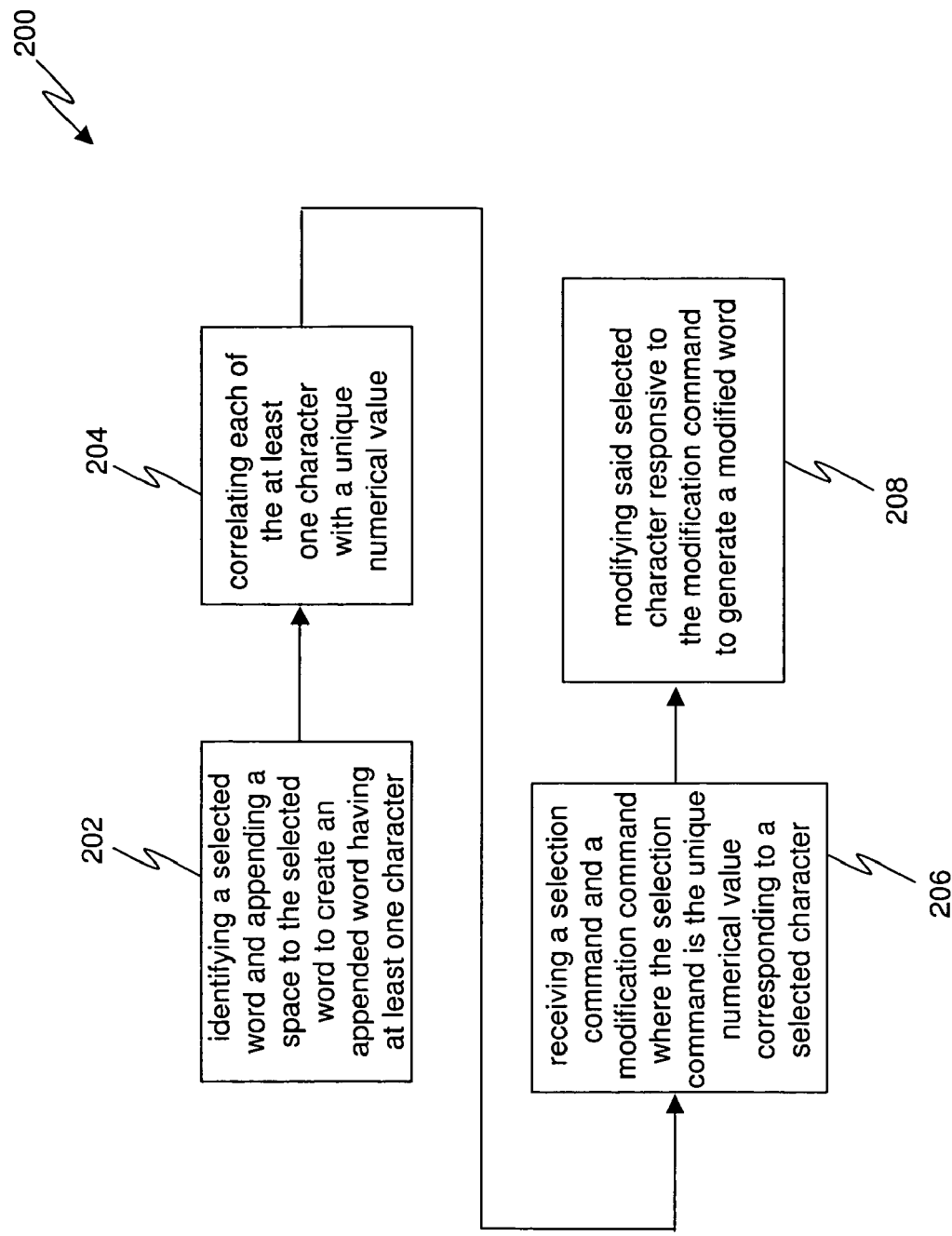
FIG. 2 is a block diagram illustrating a method for manipulating characters displayed on a display screen using a speech recognition software application having a spelling User Interface (UI), in accordance with one or more embodiments.

Furthermore, a number of program modules may be stored in the drives and RAM 112 of the general computer system 102. Program modules control how the general computer system 102 functions and interacts with the user, with I/O devices or with other computers. Program modules include routines, operating systems 164, target application program modules 166, data structures, browsers, and other software or firmware components. Some embodiments may be included in an application module and the application module may conveniently be implemented in one or more program modules, such as a speech engine correction module 170 based upon the methods described herein. The target application program modules 166 may comprise a variety of applications used in conjunction with one or more embodiments, some of which are shown in FIG. 2. The purposes of and interactions between some of these program modules are discussed more fully in the text describing FIG. 2. These include any application and/or control having a text field, e.g. an email application, a word processor program (such as Microsoft® Word, produced by Microsoft Corporation of Redmond, Wash.), a handwriting recognition program module, the speech engine correction module 170, and an input method editor (IME).

It should be appreciated that no particular programming language is described for carrying out the various procedures described in the detailed description because it is considered that the operations, steps, and procedures described and illustrated in the accompanying drawings are sufficiently disclosed to permit one of ordinary skill in the art to practice embodiments discussed herein. Moreover, there are many computers and operating systems which may be used in practicing an exemplary embodiment, and therefore no detailed computer program could be provided which would be applicable to all of these many different systems. Each user of a particular computer will be aware of the language and tools which are most useful for that user's needs and purposes.

Referring to FIG. 2, a block diagram illustrating a method 200 for manipulating characters displayed on a display screen 148 by a target software application using a speech recognition software application having a spelling User Interface (UI), is shown and is discussed in terms of a user entering a word into the target software application using the speech recognition software application.

Figure 3:
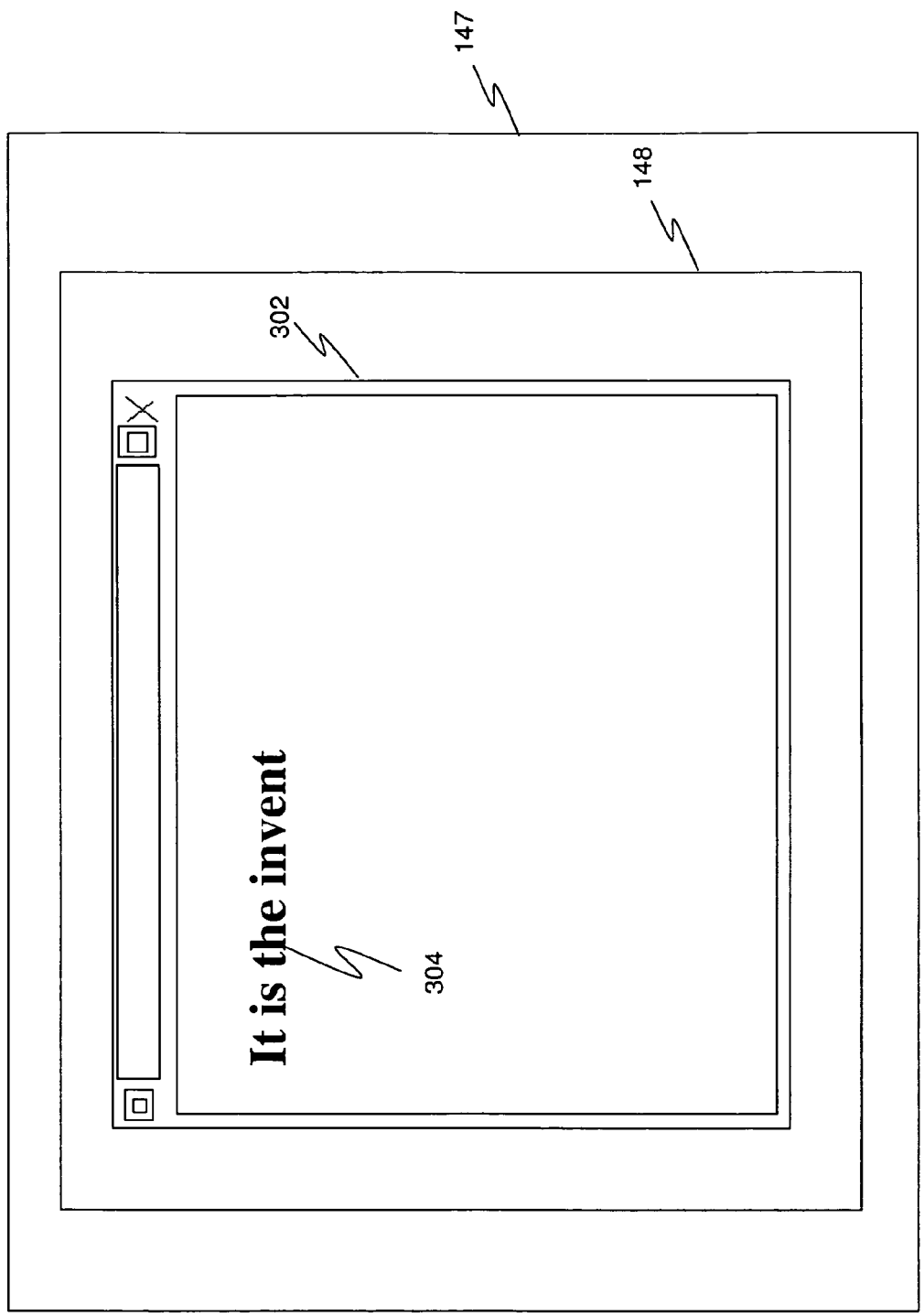
FIG. 3 is a front view of a display screen of the system in FIG. 1 illustrating the method of FIG. 2 in accordance with one or more embodiments.

In order to enter text into the target software application, a user may begin by operating the speech recognition software application and the target software application to cause at least one character to be display on the display screen 148 via the target software application, as shown in FIG. 3. It should be appreciated that the processing device 104 may operate the speech recognition software application in response to a user instruction entered via the microphone input device 135 and/or the processing device 104 may implement the speech recognition software application in response to an instruction recognized by the Operating System 164 upon startup, such as a "boot up" instruction. Upon activation of the speech recognition software application, the user may vocally communicate a command to the speech recognition software application via the microphone input device 140 to active a target software application, wherein the target software application may be any application and/or control having a text field, such as an email application and Microsoft® Word. Once the target software application is activated, a target software application window 302 is displayed on the display screen 148. The user may then operate the speech recognition software application by entering text via the microphone input device 140 to cause the speech recognition software application to display the entered text 304 via the target software application window 302. In this case a series of entered text 304 has been entered in the system 100; wherein the series of entered text 304 has been entered as "I" "t", "space" "i", "s", "space", "t", "h", "e", "space", "i", "n", "t", "e", "n", "t". However, the speech recognition software application has "heard" the series of entered text 304 as "I", "t", "space", "i", "s", "space", "t", "h", "e", "space", "i", "n", "v", "e", "n", "t" and thus, the last word "invent" needs to be corrected to be "intent." It should be appreciated that the above text may have been dictated as whole words or as letters (characters) and that the dictation capability may be an operating system level component.

Figure 4:
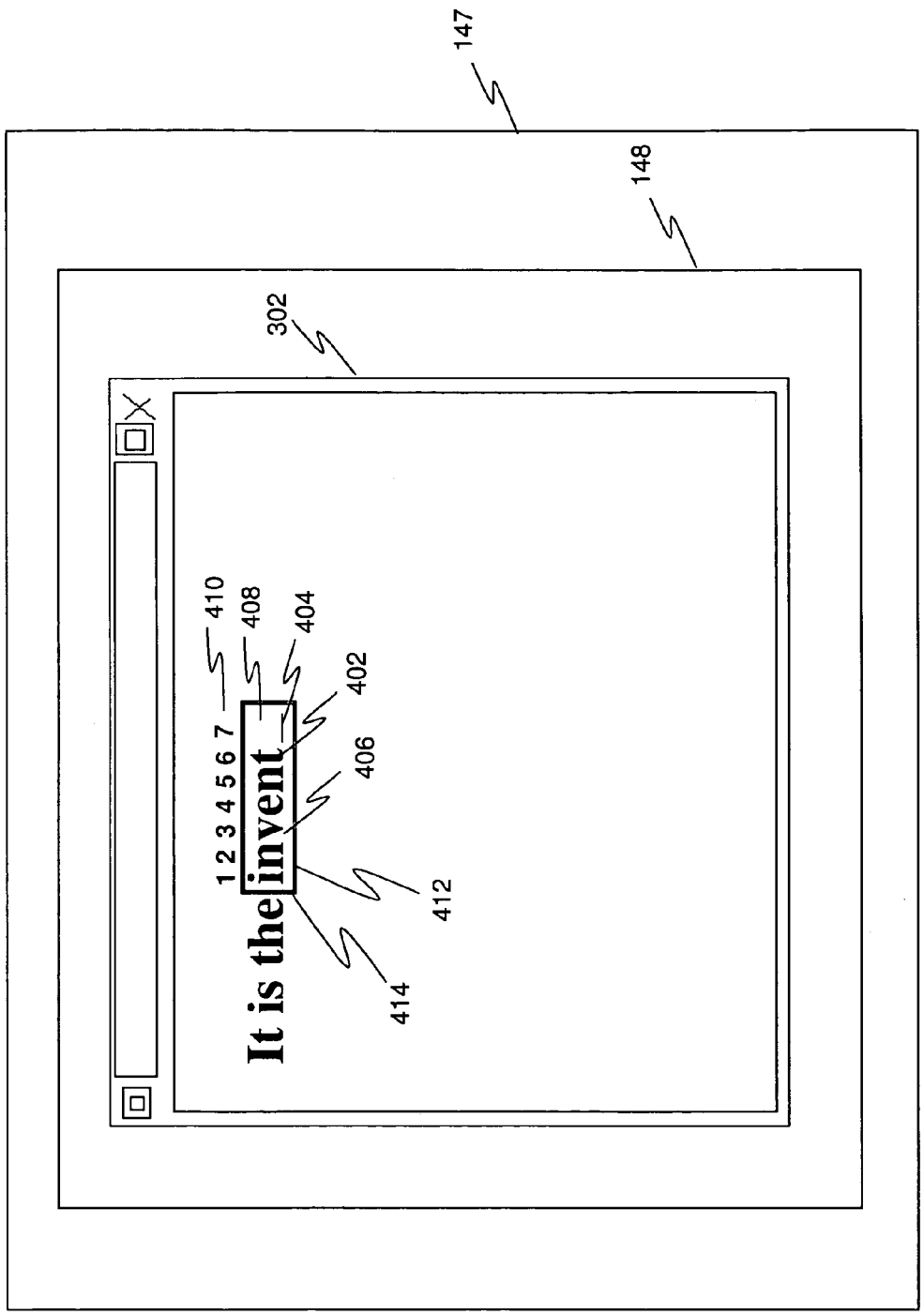
FIG. 4 is a front view of a display screen of the system in FIG. 1 illustrating the method of FIG. 2 in accordance with one or more embodiments.

Referring to FIG. 4, in order to correct this, a spelling command is enabled to invoke the spelling UI allowing a user to vocally communicate a word, i.e. "spell intent," to be modified to the general computer system 102. Upon the general computer system 102 receiving the spelling command, the selected word is identified and an appended word 402 is created by appending at least one space 404 to the selected word, wherein the appended word 402 includes at least one character 406 to be modified, as shown in operational block 202. Each of the characters 408 in the appended word are then assigned and correlated with a unique numerical value 410, as shown in operational block 204. The appended word 402 is then displayed via the display screen 148 to visually communicate the correlation between each of the characters 408 in the appended word 402 and their assigned unique numerical value 410. This correlation may be visually communicated by drawing a box 412 around the appended word 402 on the display screen 148 and displaying each of the unique numerical values 410 adjacent their assigned character 408 in the appended word 402. As such, each of the characters 408 is "assigned" a unique numerical value 410 to which each character 408 is correlated. For example, a user who wants to change the word "invent" 414 to "intent", would vocally enter a command in to the speech recognition software application, such as "spell invent". This would implement the spelling UI and cause a box 412 to be displayed on the display screen 148 around the word "invent" 414. This also causes each letter in the word "invent" 414 to be assigned a unique numerical value 410 which is displayed adjacent its corresponding character 408, both of which is shown in FIG. 4. This will allow the user to change and/or correct any letter in the word "invent."

At this point, a selection command and a modification command may be received by the general computer system 102, wherein the selection command is the unique numerical value 410 corresponding to a selected character, as shown in operational block 206. This indicates to the general computer system 102 which character in the appended word 402 is to be changed. Once the general computer system 102 receives the modification command a modified word is generated by modifying the selected character responsive to the modification command, as shown in operational block 208. It should be appreciated that the user may enter in a plurality of modification commands, such as the "delete", "insert", or the letter/character to be added, wherein each of these situations are discussed below.

Figure 5:
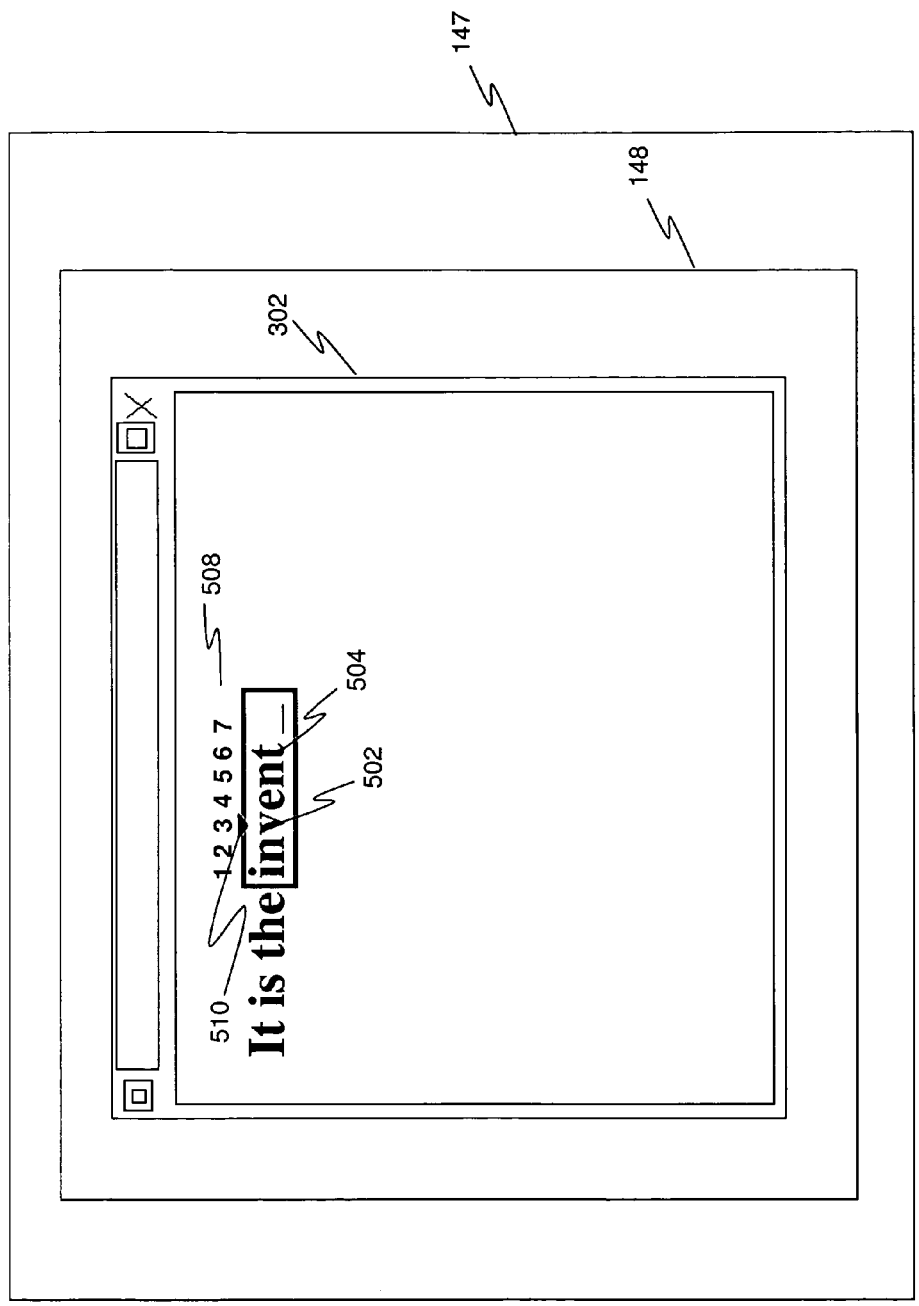
FIG. 5 is a front view of a display screen of the system in FIG. 1 illustrating the method of FIG. 2 in accordance with one or more embodiments.
Figure 6:
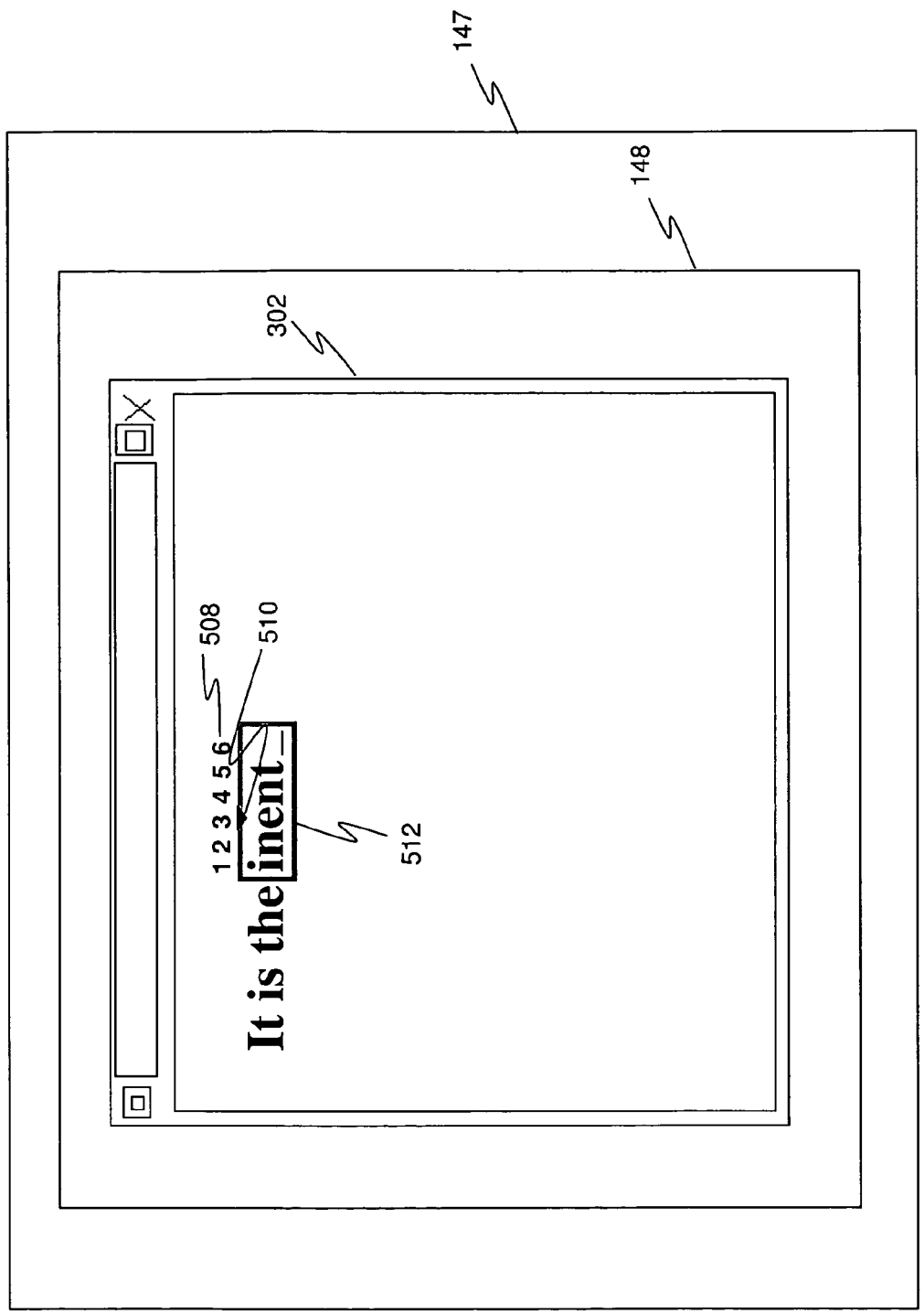
FIG. 6 is a front view of a display screen of the system in FIG. 1 illustrating the method of FIG. 2 in accordance with one or more embodiments.

For example, referring to FIG. 5 consider the case above where the user would like to delete the letter "v" 502 in the appended word "invent_" 504 displayed on the display screen 148. As discussed hereinabove, the user communicates the unique numerical value corresponding to the character to be changed to the general computer system 102. It should be appreciated that although these unique numerical values 508 start with the number 1 and increase by 1, any unique numerical values 508 and increments may be assigned. As can been seen, the letter "v" 502 in the appended word "invent_" 504 is assigned a unique numerical value 508 of "3". As such, the user would vocally communicate the number "3" to the general computer system 102. This "selects" the letter corresponding to and correlated with the number "3" as indicated by the caret 510, which in this case is the letter "v" 502 in the appended word "invent" 504. The user may then enter the desired modification command, such as "delete" which will cause the letter "v" 502 to be deleted from the appended word "invent" 504, leaving the resultant "inent" 512, as shown in FIG. 6. Thus, the modification command "delete" will remove the selected letter and its corresponding space from the appended word and the selection caret 510 will select the next subsequent character, i.e. "e."

Figure 7:
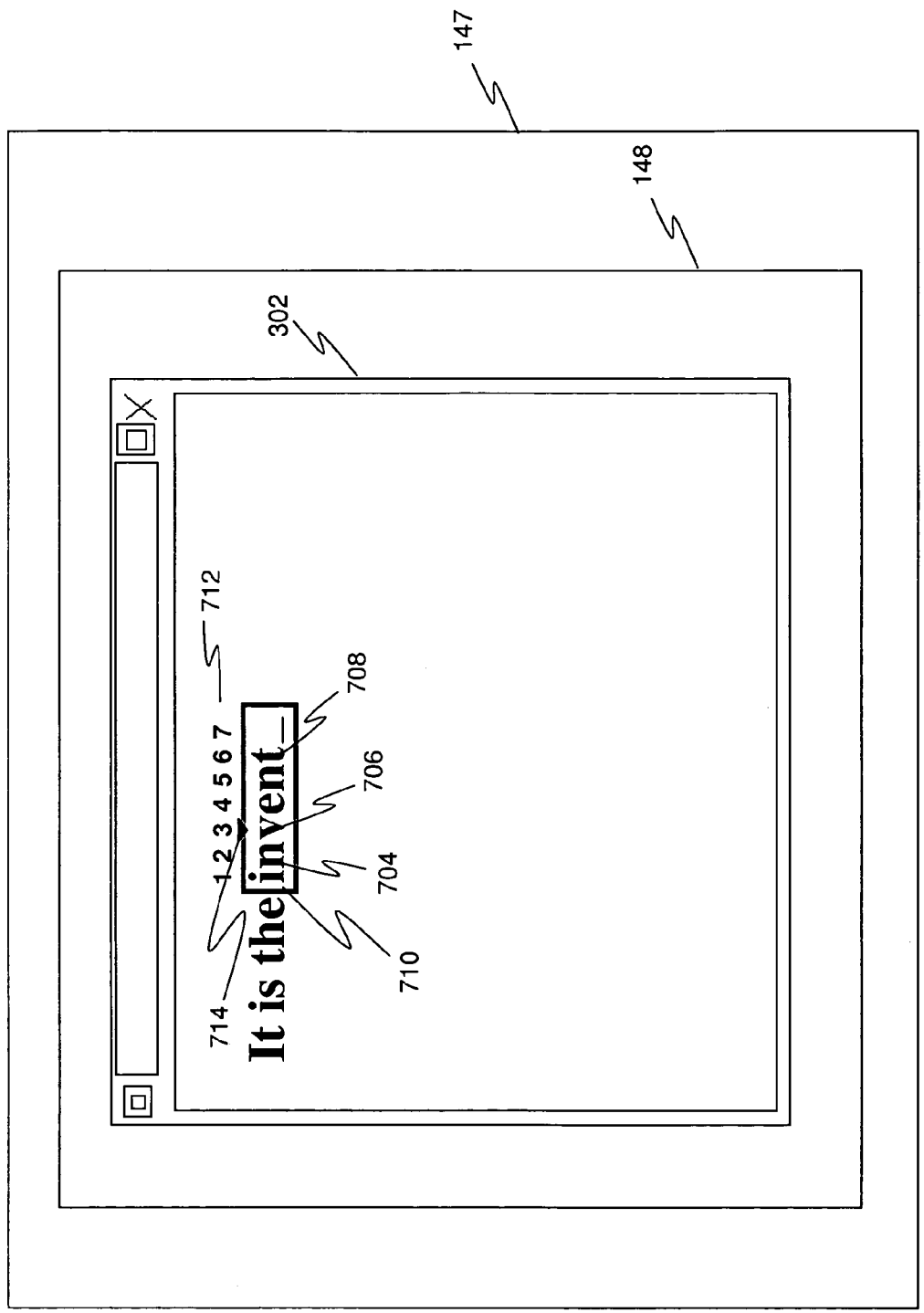
FIG. 7 is a front view of a display screen of the system in FIG. 1 illustrating the method of FIG. 2 in accordance with one or more embodiments.

On the other hand, referring to FIG. 7 consider the case where the user wants to insert a character, such as a letter or space, between the letter "n" 704 and the letter "v" 706 in the word "invent" displayed on the display screen 148. In essence, the user wants to insert a character into the spot corresponding to the unique numerical value "3". As discussed hereinabove, the user may implement the spelling UI by vocally communicating the command "spell invent." This causes a space to be appended to the word "invent" to create an appended word "invent_" 708 and a box 710 to be displayed around the appended word "invent_" 708 and unique numerical values 712 to be assigned and displayed adjacent each of the characters in the appended word "invent_" 708. As can been seen, the letter "v" 706 in the appended word "invent_" 708 is assigned a unique numerical value 712 of "3". As such, the user would vocally communicate the number "3" to the general computer system 102. This causes the general computer system 102 to "select" the letter corresponding to and correlated with the number "3" as indicated by the caret 714, which in this case is the letter "v" 706 in the appended word "invent_" 708. The user may then enter in a modification command, causing the general computer system 102 to respond in an appropriate manner.

Figure 8:
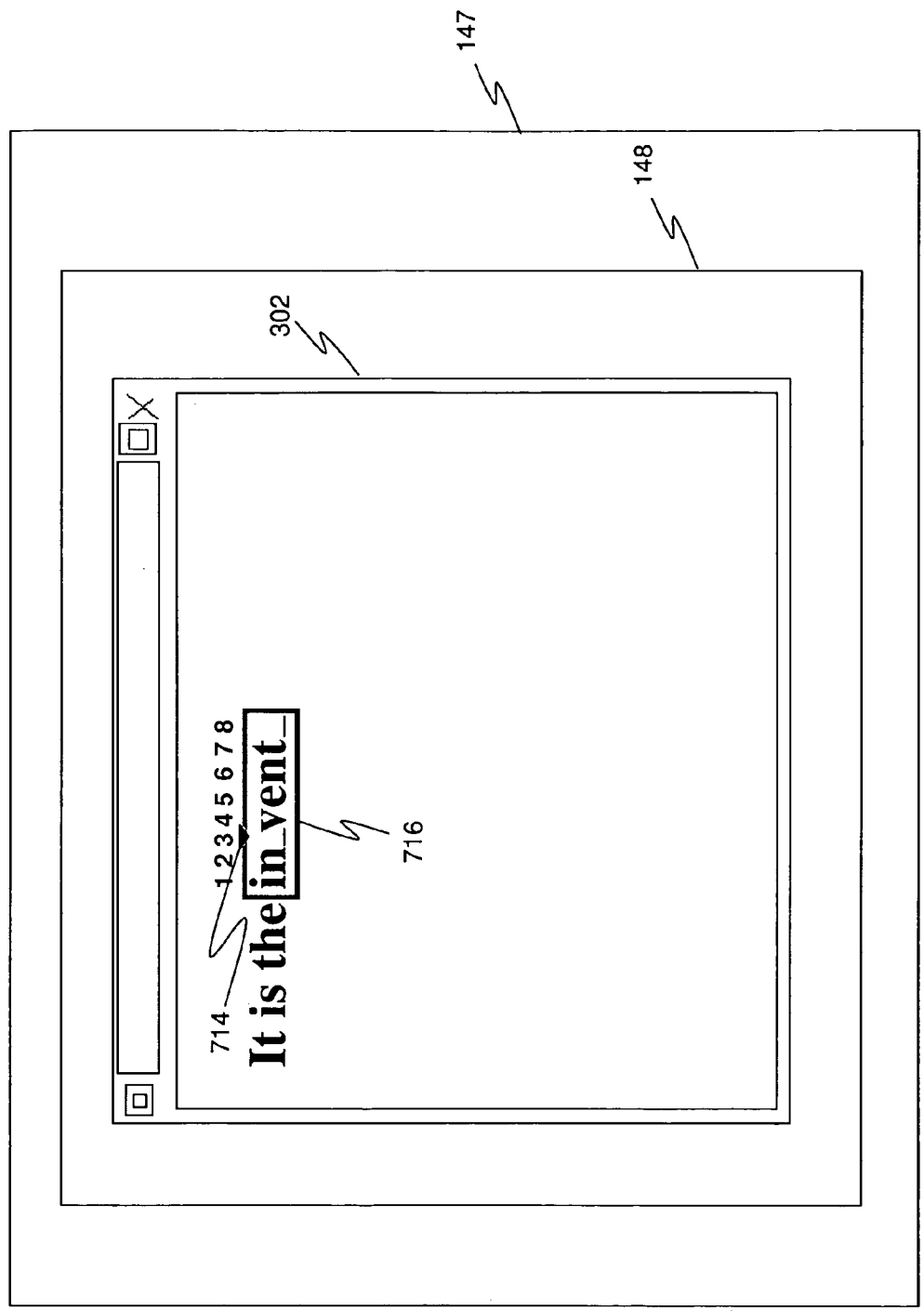
FIG. 8 is a front view of a display screen of the system in FIG. 1 illustrating the method of FIG. 2 in accordance with one or more embodiments.
Figure 9:
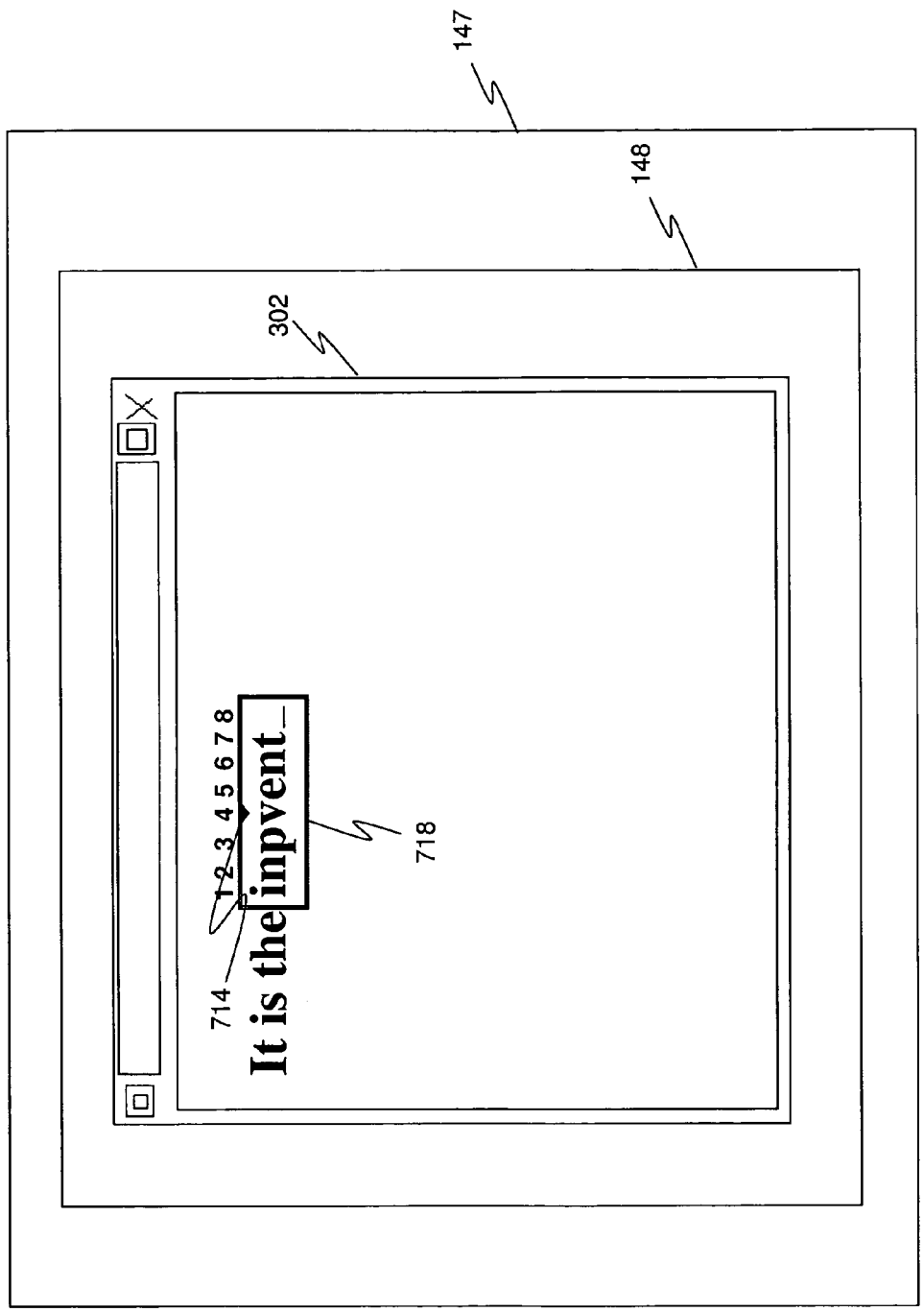
FIG. 9 is a front view of a display screen of the system in FIG. 1 illustrating the method of FIG. 2 in accordance with one or more embodiments.

For example if the user communicates the modification command "insert" and then communicates the word "space", then a space will be inserted between the letter "n" 704 and the letter "v" 706, effectively changing the appended word "invent_" 708 to "in vent_" 716, as shown in FIG. 8. In this case the caret 714 would remain in place to indicate that the space correlated with the unique numerical value "3" has been selected. However, if the user communicates the command "insert" and then communicates the letter "p", then the letter "p" will be inserted between the letter "n" 704 and the letter "v" 706, effectively changing the appended word "invent_" to "inpvent" 718, as shown in FIG. 9, and the selection caret 714 will shift to the following character to indicate that the following character (i.e. the character corresponding to the unique numerical value "4") has been selected.

Figure 10:
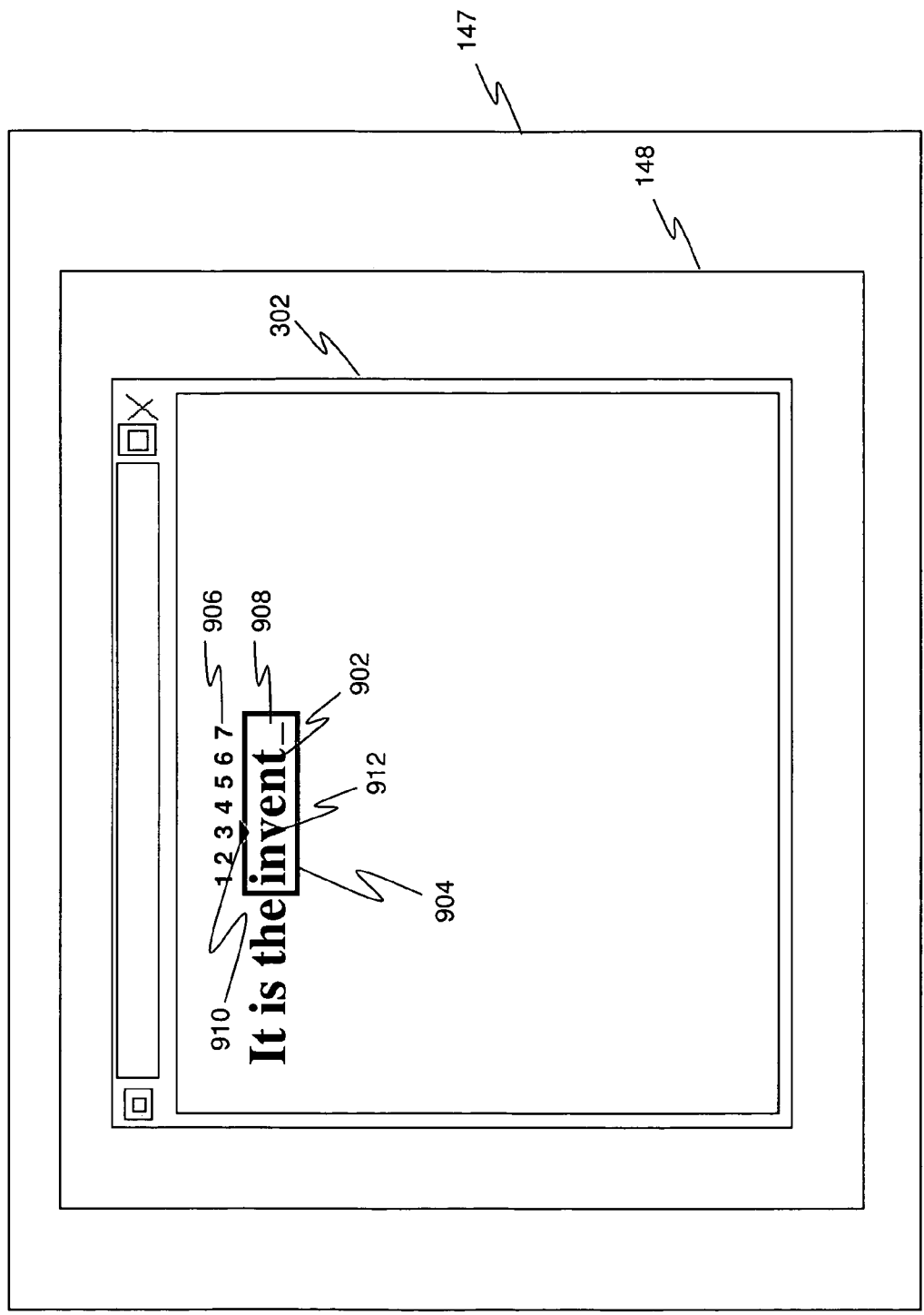
FIG. 10 is a front view of a display screen of the system in FIG. 1 illustrating the method of FIG. 2 in accordance with one or more embodiments.
Figure 11:
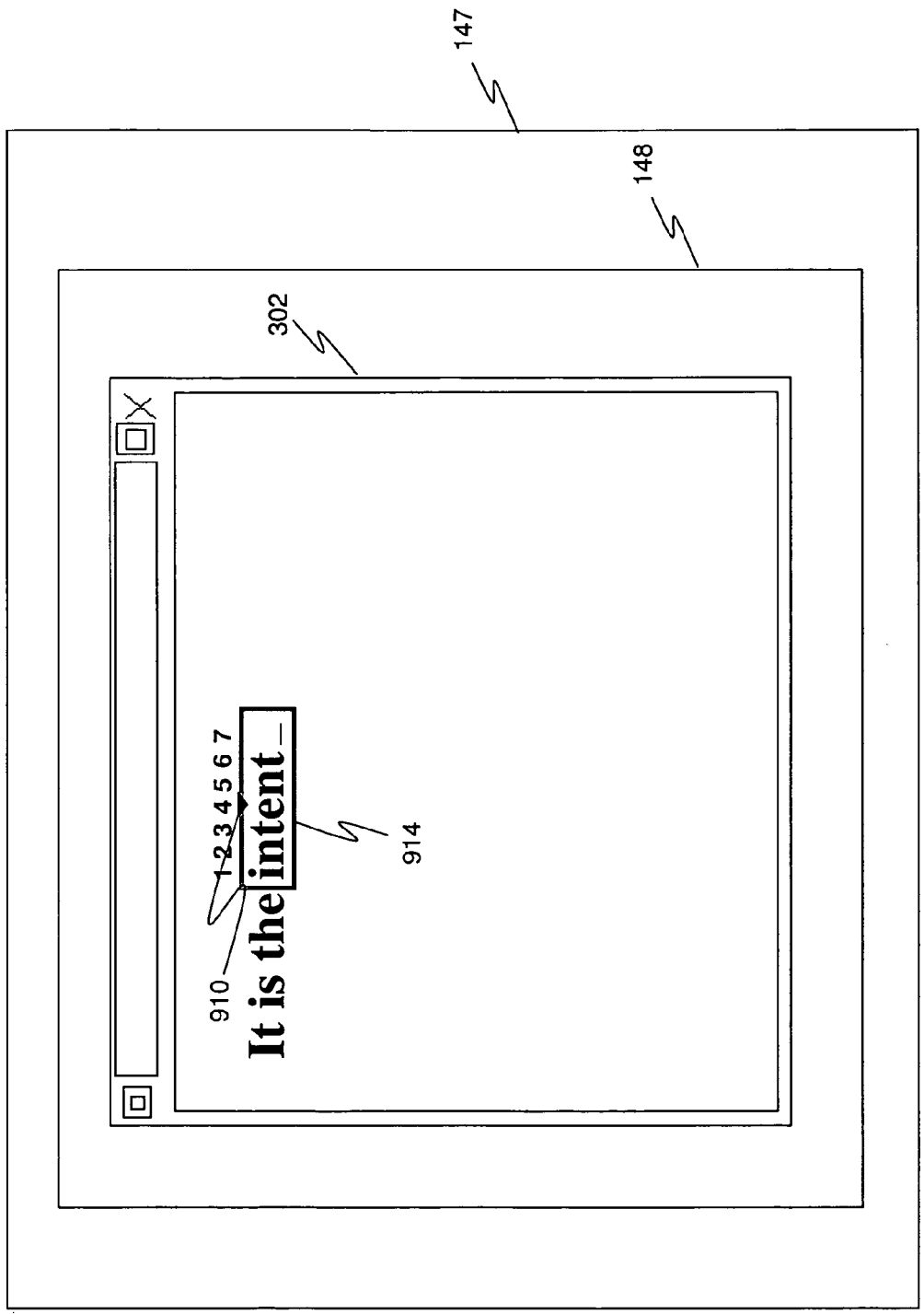
FIG. 11 is a front view of a display screen of the system in FIG. 1 illustrating the method of FIG. 2 in accordance with one or more embodiments.

Similarly, referring to FIG. 10 consider the case where the user simply wants to change a letter in the word "invent" displayed on the display screen 148. As discussed hereinabove, the user may implement the spelling UI by vocally communicating the command "spell invent". This causes a space to be appended to the word "invent" to create an appended word "invent_" 902 and a box 904 to be displayed around the appended word "invent_" 902 and unique numerical values 906 to be assigned and displayed adjacent each of the characters 908 in the appended word "invent_" 902. As can been seen, the letter "v" 912 in the appended word "invent_" 902 is assigned a unique numerical value 906 of "3." As such, the user would vocally communicate the number "3" to the computer system 102. This causes the letter corresponding to and correlated with the number "3" to be selected as indicated by the caret 910, which in this case is the letter "v" 912 in the appended word "invent_" 902. The user may then enter in a modification command (in this case the command is simply a letter) causing the computer system to respond in an appropriate manner. For example if the user communicates the modification command "t" after the number "3", then the letter "v" 912 will be replaced with the letter "t", effectively changing the appended word "invent_" 902 to the word "intent" 914, as shown in FIG. 11. At this point the selection caret 910 will shift to the following character to indicate that the following character (i.e. the character corresponding to the unique numerical value "4") has been selected.

Figure 12:
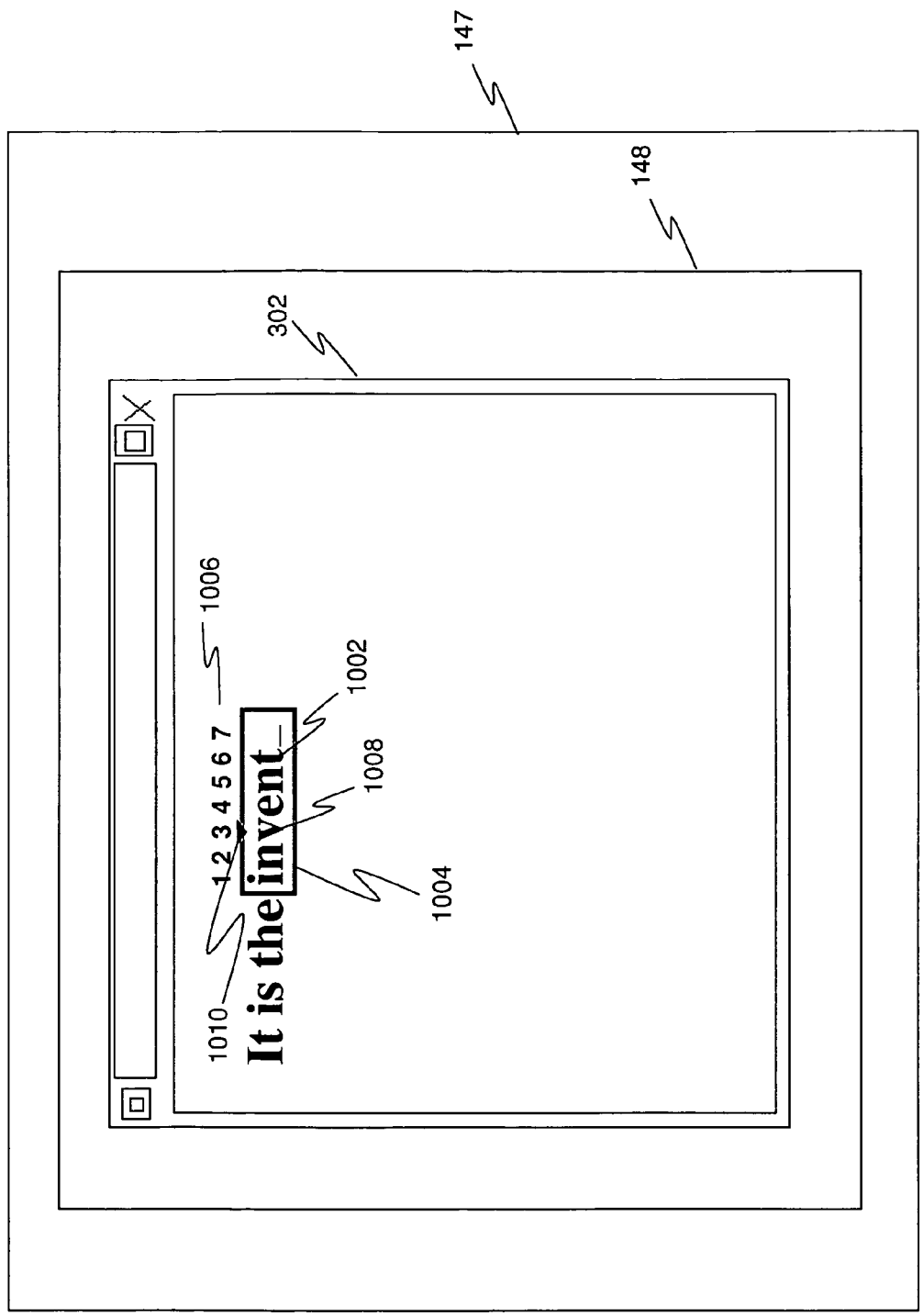
FIG. 12 is a front view of a display screen of the system in FIG. 1 illustrating the method of FIG. 2 in accordance with one or more embodiments.

It should be appreciated that once a user enters the unique numerical value corresponding to the letter to be changed, a menu of suggested modification commands may be displayed, such as a dropdown menu, where each suggested action would be assigned its own unique numerical value. For example, referring to FIG. 12, consider the case where the user wants to change a letter in the word "invent" displayed on the display screen 148. The user will implement the spelling UI by vocally communicating the command "spell invent". This causes a space to be appended to the selected word "invent" to create an appended word "invent_" 1002 and a box 1004 to be displayed around the appended word "invent_" 1002 and unique numerical values 1006 to be displayed adjacent each of the letters in the appended word "invent_" 1002. As can been seen, the letter "v" 1008 in the appended word "invent_" 1002 is assigned a unique numerical value 1006 of "3." As such, the user would vocally communicate the number "3" to the general computer system 102 to "select" the character corresponding to and correlated with the unique numerical value "3" as indicated by the caret 1010, which in this case is the letter "v" 1008 in the appended word "invent_" 1002.

Figure 13:
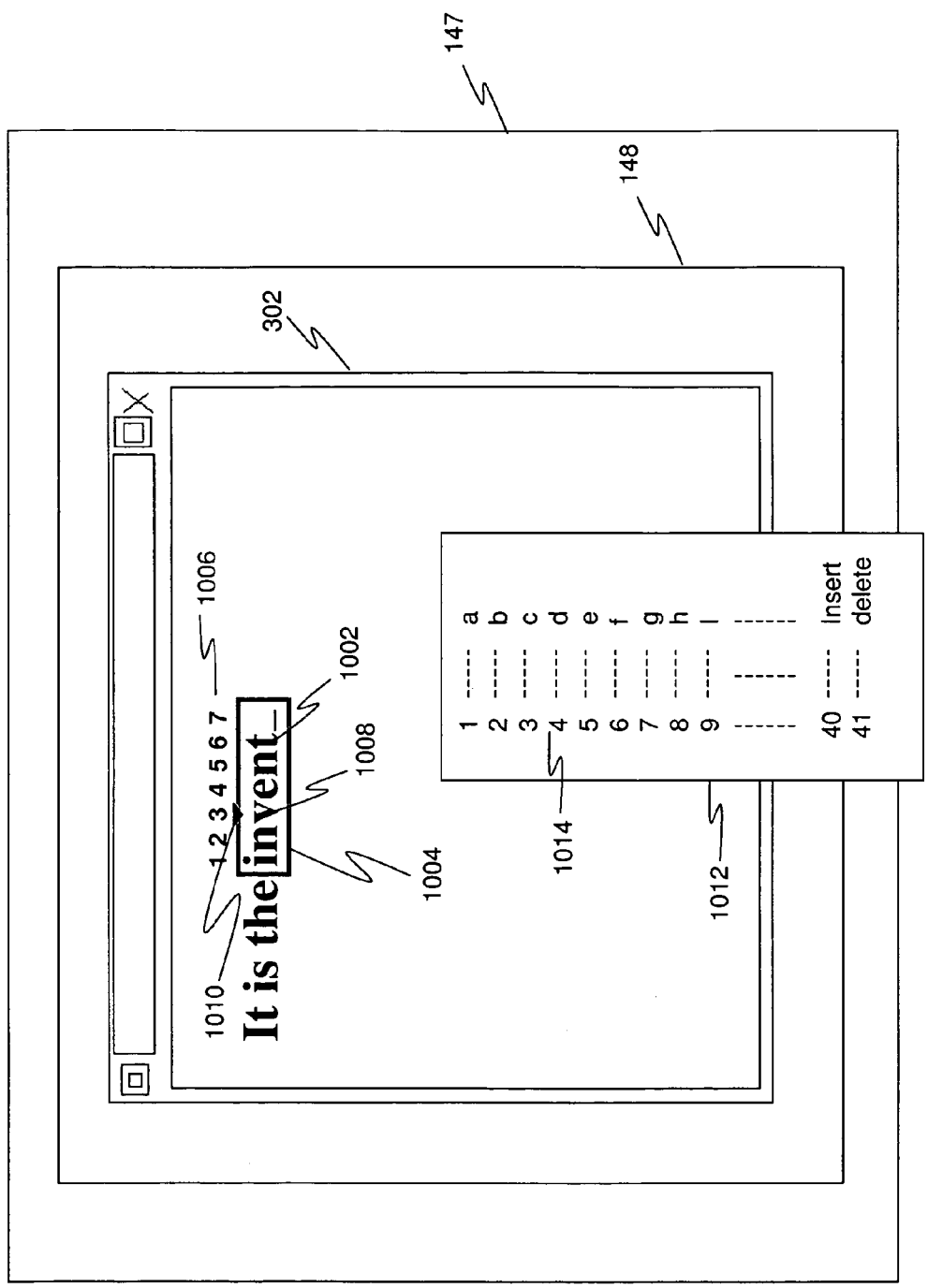
FIG. 13 is a front view of a display screen of the system in FIG. 1 illustrating the method of FIG. 2 in accordance with one or more embodiments.
Figure 14:
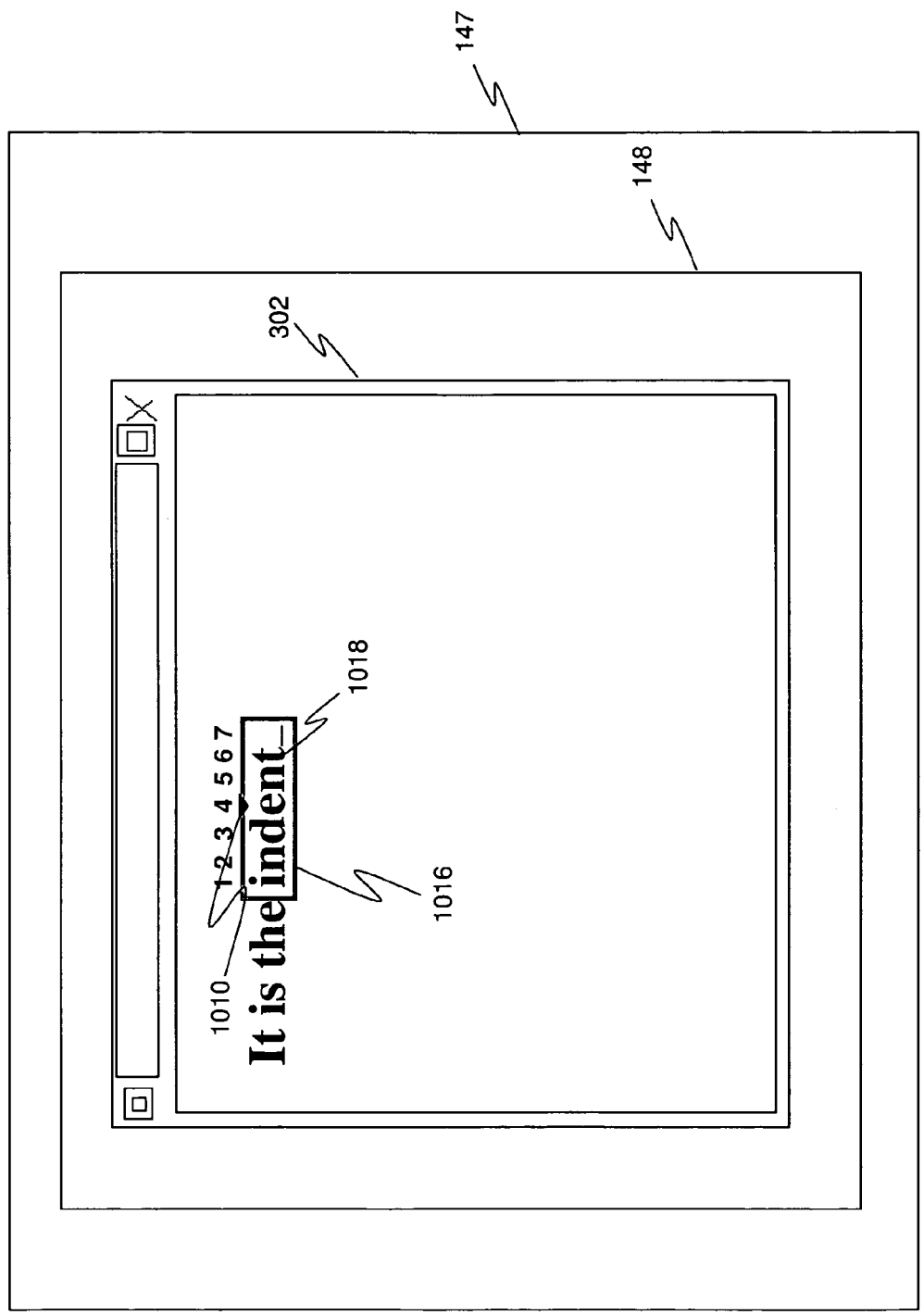
FIG. 14 is a front view of a display screen of the system in FIG. 1 illustrating the method of FIG. 2 in accordance with one or more embodiments.

Referring to FIG. 13, a menu 1012 may be displayed on the display screen 148 giving the user a number of modification command choices, each of which is assigned a second unique numerical value 1014. The user may then enter a modification command which is the second unique numerical value 1014 correlated with the desired modification command causing the speech recognition software application to respond in an appropriate manner. For example, if the user communicates the numerical value "4" after the number "3" then the letter "v" 1008 will be replaced with the letter "d" 1016, effectively changing the appended word "invent_" 1002 to the word "indent" 1018, as shown in FIG. 14. As above, the selection caret 1010 will shift to the following character to indicate that the following character (i.e. the character corresponding to the unique numerical value "4") has been selected.

It should be appreciated that the menu 1012 of suggested modification commands may include any modification commands suitable to the desired end purpose, such as a menu of characters/words that are acoustically similar to the selected letter or word, e.g. if "v" is selected, then the menu 1012 will contain "d", "t", "e", "g", "3". Additionally, the menu 1012 may also contain the capitalized form of the characters, e.g. "V", as well as an auto-complete list from a spell checker. As such, for this example the menu 1012 may include the words "indent", "intent", "amend." Furthermore, it should be appreciated that one or more embodiments may include voice commands that performing multiple functions simultaneously, e.g. "Change 3 to "e" as in eagle," or "Change t to g" may change the letter "t" to the letter "g" if there were only one letter "t" in the selected word. If there were two letters "t" in the selected word, feedback may be provided to the user to be more precise. Moreover, other commands may also be provided such as "undo" which may revert previously changed characters to their previous state, e.g. if the user says "cap that" (to capitalize the selected letter), but the input is recognized as "caret", then the user may say "undo" to revert the letter to the previous state.

In accordance with an exemplary embodiment, the processing of FIG. 2 may be implemented, wholly or partially, by a controller operating in response to a machine-readable computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing.

Moreover, some embodiments may be embodied in the form of a computer or controller implemented processes. Embodiments may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing some embodiments. Embodiments can also be ,embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing one or more embodiments. When implemented on a general-purpose microprocessor the computer program code segments may configure the microprocessor to create specific logic circuits.

While certain embodiments have been described with reference to an exemplary embodiment, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of certain embodiments without departing from the scope thereof. Therefore, it is intended that embodiments not be limited to the particular embodiment disclosed as the best mode contemplated for carrying certain embodiments, but that embodiments will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A computer-implemented method comprising:
 identifying a word that includes modifiable characters;
 correlating a different numerical value of a first set of numerical values with each individual character of the modifiable characters; and
 causing a second set of numerical values to be displayed in response to a selection of one of the numerical values of the first set of numerical values, each numerical value of the second set of numerical values being associated with a different character modification and being selectable to cause one of the modifiable characters correlated with the one of the numerical values of the first set of numerical values to be modified such that each of the modifiable characters is individually modifiable.

2. The computer-implemented method of claim 1, wherein identifying the word is responsive to an audio selection of the word.

3. The computer-implemented method of claim 1, wherein identifying the word is responsive to a command to modify the word.

4. The computer-implemented method of claim 1, wherein each of the first set of numerical values comprises a unique numerical value.

5. The computer-implemented method of claim 1, wherein said correlating further comprises causing each different numerical value of the first set of numerical values to be displayed adjacent to a displayed version of the word.

6. The computer-implemented method of claim 1, further comprising:
   receiving an indication of a selection of one of the numerical values of the second set of numerical values; and
   modifying the one of the modifiable characters responsive to the selection.

7. The computer-implemented method of claim 6, wherein modifying the one of the modifiable characters causes the one of the modifiable characters to be changed to a different character.

8. The computer-implemented method of claim 6, wherein modifying the one of the modifiable characters causes at least one of:
   the one of the modifiable characters to be deleted; or
   an additional character to be inserted adjacent to the one of the modifiable characters.

9. The computer-implemented method of claim 1, wherein each different character modification comprises a suggested modification to the one of the modifiable characters.

10. A computer-implemented method comprising:
   assigning a first set of unique values to characters of a word such that each character of the word is associated with a respective unique value of the first set of unique values; and
   displaying a second set of unique values in response to a selection of a value of the first set of unique values, each unique value of the second set of unique values corresponding to a different character modification for a particular character of the word that corresponds to the unique value of the first set of unique values, and
   causing the particular character of the word to be modified in response to a selection of one of the unique values of the second set of unique values.

11. The computer-implemented method of claim 10, wherein the first set of unique values comprise numerical values.

12. The computer-implemented method of claim 10, wherein assigning the first set of unique values to each of the characters of the word is responsive to an audio selection of the word.

13. The computer-implemented method of claim 10, wherein said displaying comprises causing each of the second set of unique values to be displayed adjacent to a respective different character modification.

14. The computer-implemented method of claim 10, wherein said causing comprises causing the particular character to be deleted or an additional character to be inserted adjacent to the particular character.

15. The computer-implemented method of claim 10, wherein each different character modification comprises a suggested modification for the particular character.

16. One or more computer-readable media storing computer-executable instructions that, when executed by a computing device, cause the computing device to:
   correlate a first set of values with characters of a word, each value of the first set of values being a different value and being associated with a single character of the characters;
   display modification options for a particular character of the word in response to a selection of a value of the first set of values that corresponds to the particular character, each of the modification options being associated with a value of a second set of values and including a character modification that can modify the particular character in response to a selection of a respective value of the second set of values;
   receive an indication of a selection of a particular value of the second set of values; and
   modify the particular character based on one of the modification options that corresponds to the particular value.

17. The one or more computer-readable media of claim 16, wherein one or more of the first set of values comprise numerical values.

18. The one or more computer-readable media of claim 16, wherein the computer-executable instructions, when executed by the computing device, further cause the computing device to receive the indication of the selection of the particular value via audio input to the computing device.

19. The one or more computer-readable media of claim 16, wherein the modification options comprise suggested modifications to the particular character.

20. The one or more computer-readable media of claim 16, wherein the computer-executable instructions, when executed by the computing device, further cause the computing device to modify the particular character by replacing the particular character with a different character.

* * * * *